United States Patent
Kotake

(10) Patent No.: US 8,699,786 B2
(45) Date of Patent: Apr. 15, 2014

(54) 3D MODEL GENERATING APPARATUS, METHOD AND CRM BY LINE PATTERN IMAGING

(75) Inventor: Daisuke Kotake, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 336 days.

(21) Appl. No.: 12/962,231

(22) Filed: Dec. 7, 2010

(65) Prior Publication Data

US 2011/0150279 A1 Jun. 23, 2011

(30) Foreign Application Priority Data

Dec. 22, 2009 (JP) ................................. 2009-291396

(51) Int. Cl.
*G06K 9/00* (2006.01)
(52) U.S. Cl.
USPC ........................................................ 382/154
(58) Field of Classification Search
None
See application file for complete search history.

(56) References Cited

U.S. PATENT DOCUMENTS

| | | | |
|---|---|---|---|
| 7,313,265 B2 | 12/2007 | Nakai et al. | |
| 2008/0279446 A1* | 11/2008 | Hassebrook et al. | 382/154 |
| 2009/0208095 A1* | 8/2009 | Zebedin | 382/154 |

FOREIGN PATENT DOCUMENTS

| | | |
|---|---|---|
| JP | 05-081410 A | 4/1993 |
| JP | 9-035061 A | 2/1997 |
| JP | 2003-256850 A | 9/2003 |
| JP | 2004-240865 A | 8/2004 |
| JP | 2004-334819 A | 11/2004 |

OTHER PUBLICATIONS

Salvi et al., "Pattern codification strategies in structured light systems", Apr. 2004, Journal of Pattern Recognition, vol. 37, iss. 4, p. 827-849.*
Pollefeys et al., "Automated reconstruction of 3D scenes from sequences of images", Nov. 2000, ISPRS Journal of Photgrammetry and Remote Sensing, vol. 55 is. 4, p. 251-267.*
Grosso et al., "3D object reconstruction using stereo and motion", Dec. 1989, IEEE Transactions on Systems, Man and Cybernetics, vol. 19, iss. 6, p. 1465-1476.*
Konstantinos et al., "Color Edge Detection", 2000, Color Image Processing and Applications, p. 179-206.*
Pollefeys et al., "Visual modeling with a Hand-Held Camera", Sep. 1, 2004, International Journal of Computer Vision, vol. 59, iss. 3, p. 207-232.*
Lu et al., "A robust barcode reading method based on image analysis of a hierarchical feature classification", Oct. 15, 2006, IEEE/RSJ Int. Conf. on Intelligent Robots and Systems 2006, p. 3358-3362.*

(Continued)

*Primary Examiner* — Stephen R Koziol
*Assistant Examiner* — Timothy Choi
(74) *Attorney, Agent, or Firm* — Fitzpatrick, Cella, Harper & Scinto

(57) ABSTRACT

An image processing apparatus comprising: an input unit configured to input a plurality of images obtained by capturing a target object from different viewpoints; a detection unit configured to detect a plurality of line segments from each of the plurality of input images; a setting unit configured to set, for each of the plurality of detected line segments, a reference line which intersects with the line segment; an array derivation unit configured to obtain a pattern array in which a plurality of pixel value change patterns on the set reference line are aligned; and a decision unit configured to decide association of the detected line segments between the plurality of images by comparing the pixel value change patterns, contained in the obtained pattern array, between the plurality of images.

10 Claims, 6 Drawing Sheets

(56) References Cited

OTHER PUBLICATIONS

Chen et al., "Detection of coded concentric rings for camera calibration", Oct. 29, 2008, 9th Int. Conf. on Signal Processing 2008, p. 1406-1409.*

Muller et al., "Image-based Procedural Modeling of Facades", Jul. 2007, ACM Transactions on Graphics, vol. 26, No. 3, art. 85. p. 85-1-85-9.*

Drummond, T., et al., "Real-Time Visual Tracking of Complex Structures", IEEE Transactions on Pattern Analysis and Machine Intelligence, vol. 24, No. 7, pp. 932-946, Jul. 2002.

Zhang, Z., "Estimating Motion and Structure from Correspondences of Line Segments between Two Perspective Images," IEEE Transactions on Pattern Analysis and Machine Intelligence, vol. 17, No. 12, pp. 1129-1139, Dec. 1995.

Taylor, C., et al., "Structure and Motion from Line Segments in Multiple Images", IEEE Transactions on Pattern Analysis and Machine Intelligence, vol. 17, No. 11, pp. 1021-1032, Nov. 1995.

Schmid, C., et al., "Automatic Line Matching Across Views," Proc. IEEE Computer Society Conference on Computer Vision and Pattern Recognition 1997, pp. 666-671, 1997.

Bay, H., et al., "Wide-Baseline Stereo Matching with Line Segments," Proc. IEEE Computer Society Conference on Computer Vision and Pattern Recognition, vol. 1, pp. 329-336, 2005.

Weng, J., et al., "Motion and Structure from Line Correspondences: Closed-Form Solution, Uniqueness, and Optimization," IEEE Transactions on Pattern Analysis and Machine Intelligence, vol. 14, No. 3, pp. 318-336, Mar. 1992.

Fischler, M., et al., "Random Sample Consensus: A Paradigm for Model Fitting with Applications to Image Analysis and Automated Cartography," Communications of the ACM, vol. 24, No. 6, pp. 381-395, Jun. 1981.

Bay, H., "3D from Line Segments in Two Poorly-Textured, Uncalibrated Images," Proc. 3rd International Symposium on 3D Data Processing, Visualization and Transmission, pp. 496-503, 2006.

Japanese Office Action dated Oct. 4, 2013 in Japanese Patent Application No. 2009-291396.

* cited by examiner

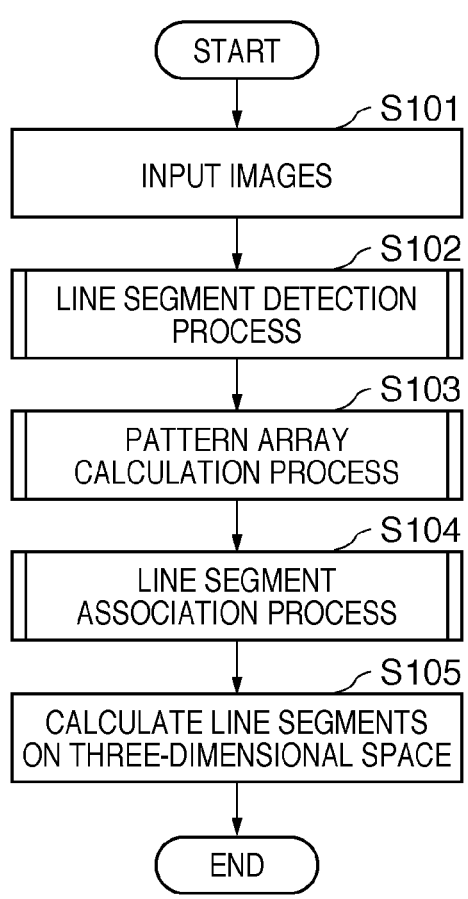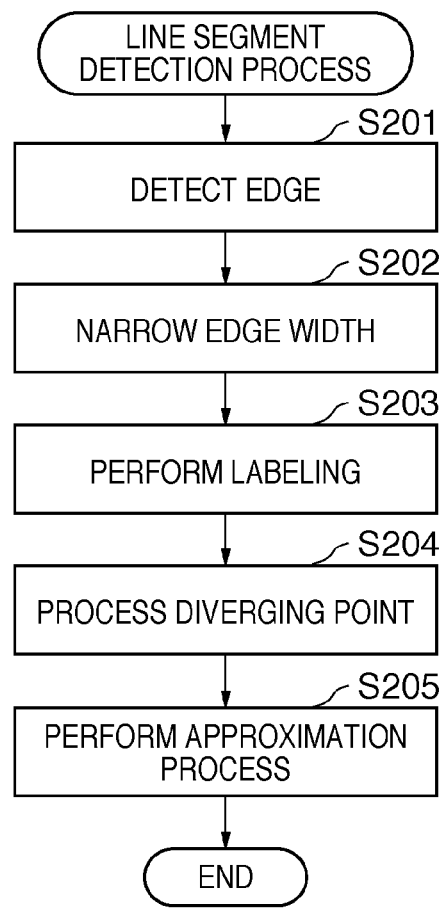

REFERENCE LINE

REFERENCE LINE

DIVIDING POINT    LINE SEGMENT OF INTEREST

LUMINANCE VALUE OF DIVIDING POINT

LUMINANCE VALUE OF BOUNDARY EDGE

REFERENCE LINE OF INTEREST

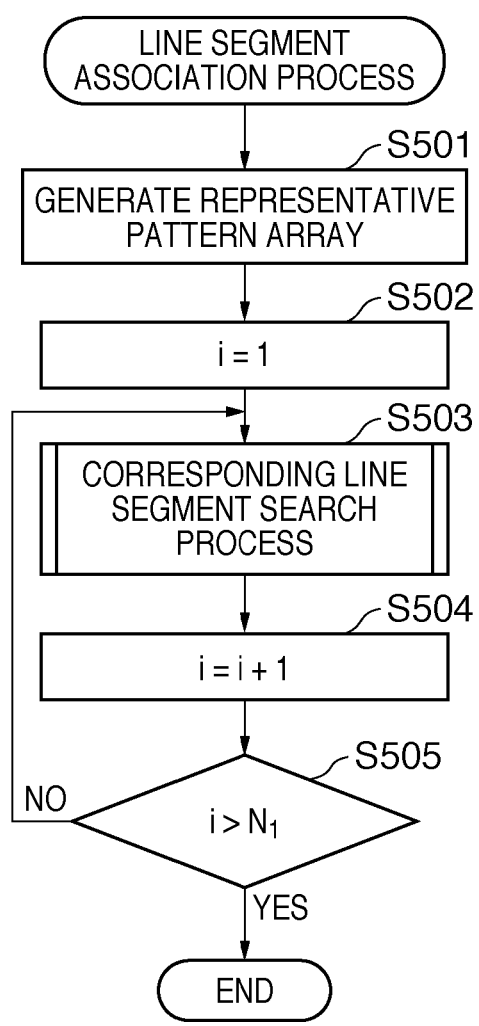

3D MODEL GENERATING APPARATUS, METHOD AND CRM BY LINE PATTERN IMAGING

BACKGROUND OF THE INVENTION

1. Field of the Invention

The present invention relates to an image processing apparatus, a processing method therefor, and a non-transitory computer-readable storage medium.

2. Description of the Related Art

In recent years, for practical applications to mixed reality and automatic traveling of robots, techniques that measure the position and orientation of a camera relative to a physical object based on a three-dimensional geometric model of the physical object are being studied. Among others, techniques that represent a three-dimensional geometric model as a set of line segments, and measure the position and orientation of a camera so as to fit projected images of the line segments to edges in an image captured by the camera are under extensive study (for example, T. Drummond and R. Cipolla, "Real-time visual tracking of complex structures," IEEE Transactions on Pattern Recognition and Machine Intelligence, vol. 24, no. 7, pp. 932-946, 2002 (to be referred to as reference 1 hereinafter)).

To measure the position and orientation of a camera based on a three-dimensional geometric model, a three-dimensional geometric model of a target physical object must be prepared in advance. With a known method, a three-dimensional geometric model of a physical object is generated based on, for example, the corresponding relationship between image features in a plurality of images obtained by capturing the physical object. Z. Zhang, "Estimating Motion and structure from correspondences of line segments between two perspective images," IEEE Transactions on Pattern Recognition and Machine Intelligence, vol. 17, no. 12, pp. 1129-1139, 1995 (to be referred to as reference 2 hereinafter) and C. J. Taylor and D. J. Kriegman, "Structure and motion from line segments in multiple images," IEEE Transactions on Pattern Recognition and Machine Intelligence, vol. 17, no. 11, pp. 1021-1032, 1995 (to be referred to as reference 3 hereinafter) disclose techniques of detecting line segments such as the contour of a physical object from two or three or more images obtained by capturing the physical object at different angles, and generating a three-dimensional geometric model which represents the physical object based on the corresponding relationships of the line segments between the images. In this case, the corresponding relationships of the line segments between the two or three or more captured images must be obtained using an appropriate method. When the number of line segments is relatively small, for example, the user may manually associate the line segments in the plurality of images displayed on the screen with each other. In contrast, as the number of line segments increases, it becomes more difficult to manually associate these line segments. To automatically, efficiently perform this association, line segment-specific information, which is independent of the observation position, must be assigned to the line segment detected in the image as a feature of this line segment.

To meet this requirement, Japanese Patent Laid-Open No. 2004-334819 discloses a technique of generating, as features of line segments detected in a plurality of images, data streams of pieces of information on pixels in the vicinities of these line segments, and comparing the data streams with each other, thereby associating a plurality of line segments detected from a plurality of images, respectively, with each other. Considering, for example, image noise and a change in illumination, it is difficult for this technique to accurately perform the association.

C. Schmid and A. Zisserman, "Automatic line matching across views," Proc. IEEE Computer Society Conference on Computer Vision and Pattern Recognition 1997, pp. 666-671, 1997 (to be referred to as reference 4 hereinafter) discloses a technique of associating and comparing one point on a line segment with another point on the line segment using the epipolar geometry between the images assuming that this epipolar geometry is known. In this technique, the epipolar geometry between the images must be estimated in advance from information (for example, feature points with high distinguishability) other than line segments.

H. Bay, V. Ferrari, and L. Van Gool, "Wide-baseline stereo matching with line segments," Proc. IEEE Computer Society Conference on Computer Vision and Pattern Recognition 2005, vol. 1, pp. 329-336, 2005 (to be referred to as reference 5 hereinafter) discloses a technique of associating the detected line segments based on the color distributions on the two sides of each of these line segments. In this technique, color histograms of pixel groups spaced apart from the detected line segment by several pixels are generated on the two sides, respectively, of this line segment and used to compare this line segment with other line segments. In this case, preliminary information such as the epipolar geometry between the images is unnecessary.

In the method disclosed in reference 5, the detected line segments are associated with each other using the color distributions on the two sides of each of these line segments as their features, so the association may fail if line segments with similar color distributions are present.

Again, in the method disclosed in reference 5, color histograms of pixels spaced apart from the detected line segment by several pixels are used as features of this line segment, so the association may fail if line segments are adjacent to each other or are densely populated.

SUMMARY OF THE INVENTION

The present invention provides a technique which can precisely associate line segments in images with each other even if similar line segments are present in the images or line segments are densely populated in the images.

According to a first aspect of the present invention, there is provided an image processing apparatus comprising: an input unit configured to input a plurality of images obtained by capturing a target object from different viewpoints; a detection unit configured to detect a plurality of line segments from each of the plurality of input images; a setting unit configured to set, for each of the plurality of detected line segments, a reference line which intersects with the line segment; an array derivation unit configured to obtain a pattern array in which a plurality of pixel value change patterns on the set reference line are aligned; and a decision unit configured to decide association of the detected line segments between the plurality of images by comparing the pixel value change patterns, contained in the obtained pattern array, between the plurality of images.

According to a second aspect of the present invention, there is provided a processing method for an image processing apparatus, comprising: inputting a plurality of images obtained by capturing a target object from different viewpoints; detecting a plurality of line segments from each of the plurality of input images; setting, for each of the plurality of detected line segments, a reference line which intersects with the line segment; obtaining a pattern array in which a plurality of pixel value change patterns on the set reference line are aligned; and deciding association of the detected line segments between the plurality of images by comparing the pixel value change patterns, contained in the obtained pattern array, between the plurality of images.

According to a third aspect of the present invention there is provided a non-transitory computer-readable storage medium storing a program for causing a computer to execute the above described processing method.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a flowchart showing an example of the overall operation of an image processing apparatus 10 shown in FIG. 1;

FIG. 4 is a flowchart showing a line segment detection process shown in step S102 of FIG. 3;

FIG. 9 is a flowchart showing a process of associating line segments in images with each other according to the second embodiment.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
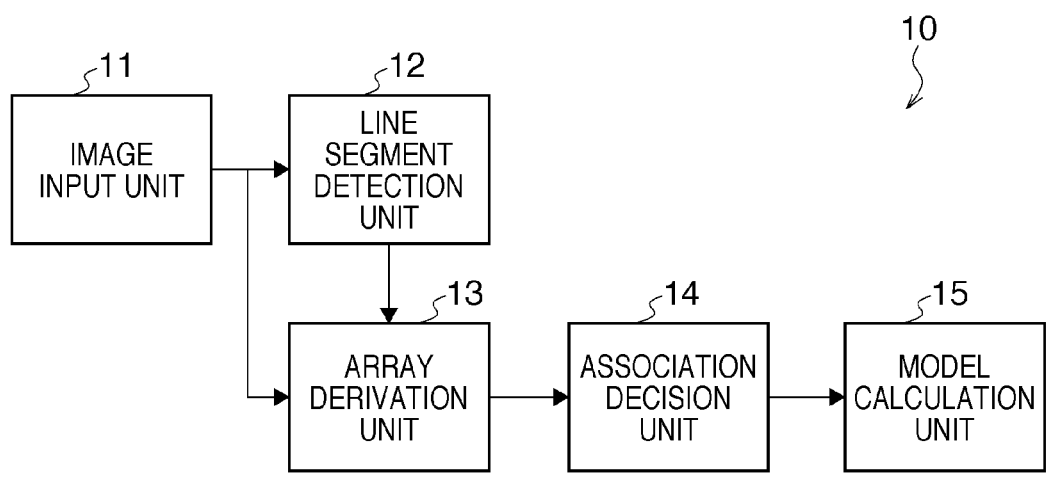
FIG. 1 is a block diagram showing an example of the functional configuration of an image processing apparatus according to an embodiment of the present invention.

FIG. 1 is a block diagram showing an example of the functional configuration of an image processing apparatus according to an embodiment of the present invention.

An image processing apparatus 10 generates a three-dimensional geometric model which represents a physical object by a set of line segments, using a plurality of images obtained by capturing the physical object. The image processing apparatus 10 is configured using a computer. The computer includes, for example, a main control means such as a CPU, and storage means such as a ROM (Read Only Memory) and a RAM (Random Access Memory). The computer may also include a communication means such as a network card or infrared rays, and an input/output means such as a display or a touch panel. Note that these constituent means are connected to each other via a bus, and controlled by executing programs stored in the storage means by the main control means.

The image processing apparatus 10 includes an image input unit 11, line segment detection unit 12, array derivation unit 13, association decision unit 14, and model calculation unit 15 as its functional configuration.

Figure 2:
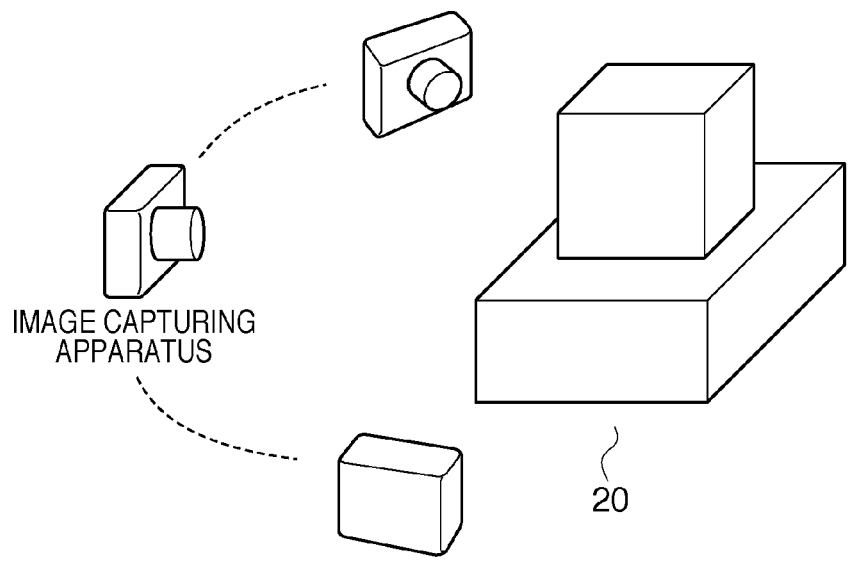
FIG. 2 is a view showing an example in which a physical object 20 is captured from a plurality of different viewpoints.

The image input unit 11 inputs an image of a physical object 20 into the apparatus. In this embodiment, the image input unit 11 inputs a plurality of images (three images in this case) obtained by capturing the physical object 20 from different viewpoints, as shown in FIG. 2. Note that when an image of the physical object 20 is stored in advance, the image input unit 11 performs the above-mentioned input by reading out the stored image. The image of the physical object 20 may be captured by, for example, a video camera (image capturing apparatus). In this case, if the output from the image capturing apparatus is, for example, an analog signal (for example, an NTSC signal), the image input unit 11 is implemented by an analog video capture board. Also, if the output from the image capturing apparatus is, for example, a digital output (for example, IEEE1394), the image input unit 11 is implemented by an IEEE1394 interface board.

The line segment detection unit 12 detects line segments from the image input by the image input unit 11. Note that in this embodiment, the unique parameters such as the focal length and the distortion parameter of the image capturing apparatus are calibrated in advance.

The array derivation unit 13 obtains a pattern array, which contains, as elements, the pixel value such as the luminance value and the change pattern of this pixel value, for each of the line segments detected by the line segment detection unit 12. Note that the pattern array is information for identifying each line segment, and is obtained based on information on the pixel value such as the luminance of the image. Details of this pattern array will be described later.

The association decision unit 14 associates with each other the line segments detected from the plurality of images (three images in this case) input by the image input unit 11. This association is performed using the pattern arrays obtained by the array derivation unit 13.

The model calculation unit 15 calculates the positions, on a three-dimensional space, of the line segments which form the physical object 20, based on the corresponding relationships of the line segments between the plurality of images, which are decided by the association decision unit 14. Thus, the image processing apparatus 10 generates a three-dimensional geometric model.

An example of the overall operation of the image processing apparatus 10 shown in FIG. 1 will be described next with reference to FIG. 3. The sequence of a process of generating a three-dimensional geometric model will be described herein.

The image processing apparatus 10 controls the image input unit 11 to input images of the physical object 20 captured from a plurality of different viewpoints (three viewpoints in this case) (S101), and controls the line segment detection unit 12 to detect line segments from each of the plurality of images (three images in this case) (S102).

After the detection of line segments is completed, the image processing apparatus 10 controls the array derivation unit 13 to obtain a pattern array for each of the detected line segments. Note that the pattern array is obtained based on the pixel value such as the luminance of the image (S103). The image processing apparatus 10 controls the association decision unit 14 to associate the line segments in the images with each other based on the pattern array of each line segment (S104). In this association, the line segments in a first image are associated with those in a second image, and then the line segments in the second image are associated with those in a third image. Thus, the line segments in the plurality of images are associated with each other.

After the association of the line segments is completed, the image processing apparatus 10 controls the model calculation unit 15 to obtain line segments (three-dimensional geometric model), on a three-dimensional space, which form the physical object 20, based on the corresponding relationships of the line segments (S105). This calculation can use, for example, the method disclosed in reference 3. Note that when the technique disclosed in reference 3 is used, the association decision unit 14 must associate at least six line segments in three or more images with each other. Methods other than that in this technique may be adopted, as a matter of course. When a technique disclosed in, for example, J. Weng, T. S. Huang, and N. Ahuja, "Motion and structure from line correspondences: closed-form solution, uniqueness, and optimization," IEEE Transactions on Pattern Recognition and Machine Intelligence, vol. 14, no. 3, pp. 318-336, 1992 (to be referred as patent reference 6 hereinafter) is used, the association decision unit 14 must associate at least 13 line segments in three images with each other.

Details of a line segment detection process shown in step S102 of FIG. 3 will be described herein with reference to FIG. 4.

When this process starts, the line segment detection unit 12 detects an edge from the image (S201). The edge means herein a point where the pixel value such as the luminance or the color density rapidly changes in the image. The edge detection can use an edge detection operator (for example, a Sobel operator or a Prewitt operator). More specifically, an edge detection operator is applied to the horizontal and vertical directions of the image. This operation is performed for each pixel. Based on the output values from the edge detection operator, the edge intensity and direction are calculated. An edge intensity I in each pixel is calculated using:

$$I=\sqrt{(f_x^2+f_y^2)}$$

where $f_x$ is the horizontal output value from the edge detection operator, and $f_y$ is the vertical output value from this operator.

Also, an edge direction $\phi$ in each pixel is calculated using:

$$\phi=\arctan(f_y/f_x)$$

The line segment detection unit 12 narrows the edge width (S202). That is, the edge detected in step S201 has a predetermined width, so its width is narrowed. This is to compensate for the influence of an edge blur and the window size of the edge detection operator. In an edge width narrowing process, the edge intensities of adjacent pixels in the edge direction are compared with that of the pixel of interest for each pixel, and a pixel with an edge intensity higher than the adjacent pixels is allowed to remain as an edge. Thus, the edge width is narrowed to one pixel. After that, the line segment detection unit 12 assigns "1" to the pixels remaining as edges and "0" to other pixels, thereby generating a binary image. The edge detection and the edge width narrowing may be performed using a Canny edge detector.

The line segment detection unit 12 labels adjacent edges in the generated binary image (S203). In this process, for example, the same label is assigned to adjacent edges when they have a distance between them, that falls within eight pixels from a certain pixel.

After the labeling is completed, the line segment detection unit 12 searches the adjacent edges classified as having the same labels for a point from which one branch diverges into a plurality of branches. The branches are cut at the diverging point, and assigned with different labels. Note that the processing of a diverging point is not performed for adjacent edges with no diverging point (S204).

The line segment detection unit 12 performs piecewise linear approximation for each branch assigned with the label (S205). In the piecewise linear approximation, first, the two ends of the branch are connected to each other by a line segment, and a new dividing point is provided to a point, which is spaced apart from the line segment by a distance that is maximum and equal to or larger than a threshold, among points on the branch. A line segment connects the dividing point and the two ends of the branch to each other, and a dividing point is provided to a point spaced apart from the line segment by a maximum distance. This process is recursively repeated until the branch is sufficiently approximated by a polygonal line. After the repetition process is completed, the coordinate positions of the two ends of each line segment that forms a polygonal line are output as the line segment detection result.

Although a line segment is detected using a labeling process and a piecewise approximation process in the description with reference to FIG. 4, the line segment detection method is not limited to this, and any method may be adopted as long as a line segment can be detected from the image. A line segment may be detected by, for example, Hough transformation.

A line segment feature description process (pattern array calculation process) shown in step S103 of FIG. 3 will be described next with reference to FIGS. 5A to 5D and 6A to 6E.

A pattern array according to this embodiment will be described first with reference to FIGS. 5A to 5D. Note that the pattern array is used to associate the line segments in the images with each other, as described above.

Figure 5A:
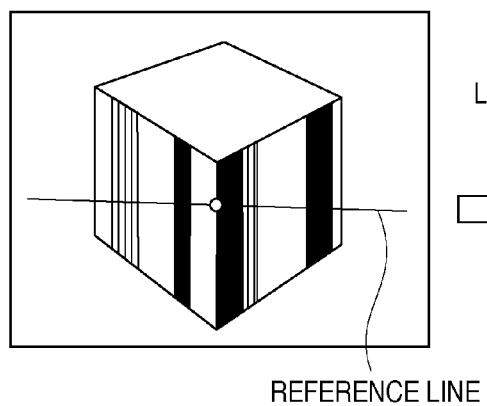
FIGS. 5A to 5D are views for explaining a pattern array according to the embodiment.
Figure 5B:
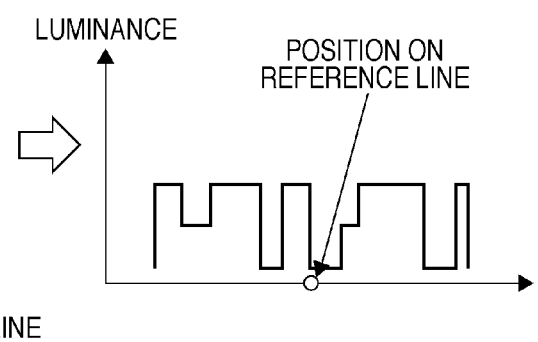
Figure 5C:
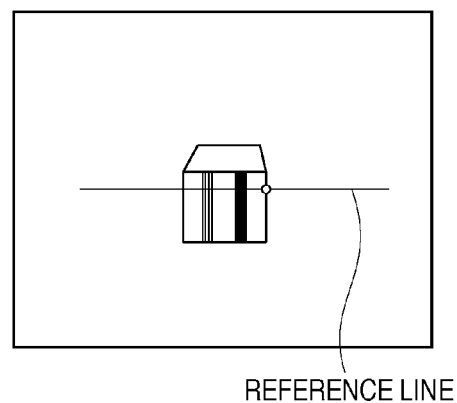

FIGS. 5A and 5C show images obtained by capturing the same object upon changing the distance. More specifically, FIG. 5A shows an image (an image obtained by capturing an object) captured from a direction different from that in FIG. 5C at a distance shorter than that in FIG. 5C. The luminance patterns on lines (reference lines) which pass through points indicated by circles in FIGS. 5A and 5C, respectively, will be considered herein. The points indicated by the circles are identical in a three-dimensional space.

Figure 5D:
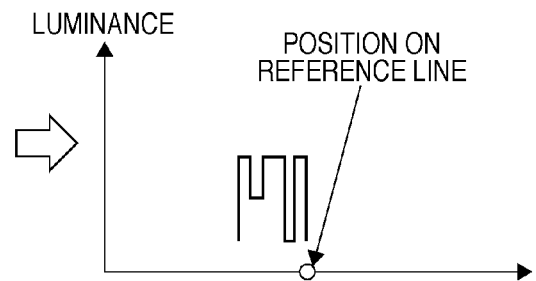

FIGS. 5B and 5D show the luminance patterns on the reference lines shown in FIGS. 5A and 5C, respectively. As can be seen by referring to FIGS. 5B and 5D, the images captured upon changing the distance have different luminance patterns on the reference lines. Hence, only a simple comparison between the luminance values of the pixels on the reference lines is insufficient to associate the line segments in the images with each other.

As can be seen by referring to the luminance patterns shown in FIGS. 5B and 5D, the order in which points (edges) where the luminance value rapidly changes appear (to be referred to as the pixel value change pattern of the luminance value hereinafter) remains the same even when the density of the luminance pattern changes as images are captured from other directions or at different magnifications.

As line segment-specific information, information in which the luminances on edges (points where the luminance value rapidly changes) on the reference line are aligned in the order in which changes in luminance take place. That is, instead of using the luminance pattern itself, information which contains the luminance value and its pixel value change pattern as elements in combination with the line segment-specific information that is the alignment of these elements is derived as a pattern array. The line segments are associated using pattern arrays derived for respective line segments.

An overview of a method of obtaining a pattern array will be described next with reference to FIGS. 6A to 6E. In the following description, a pattern array is calculated for a line segment on a target object shown in FIG. 6A.

Figure 6A:
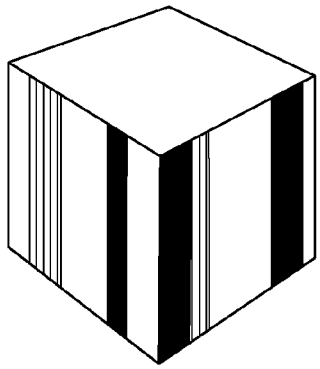
FIGS. 6A to 6E are views for explaining an overview of a method of obtaining a pattern array according to the embodiment.
Figure 6D:
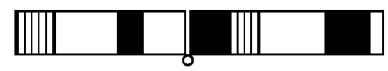
Figure 6B:
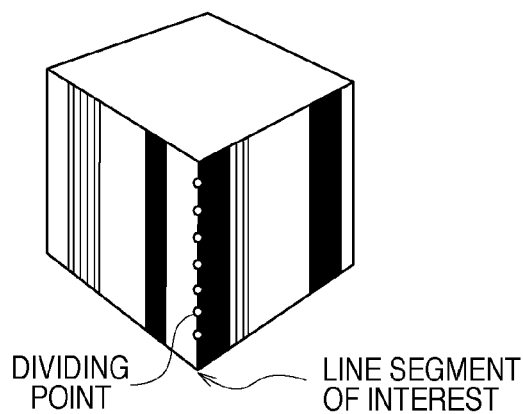

In this process, first, the line segment detected by the process in step S102 of FIG. 3 is divided to set dividing points defined on it, as shown in FIG. 6B. FIG. 6B shows only dividing points defined on a line segment ("Line Segment of Interest" in FIG. 6B) for which a pattern array is to be calculated. Note that dividing points are set so as to have, for example, an equal distance (for example, 20 pixels) between them in the image.

Figure 6E:
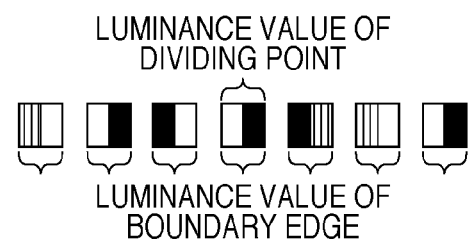
Figure 6C:
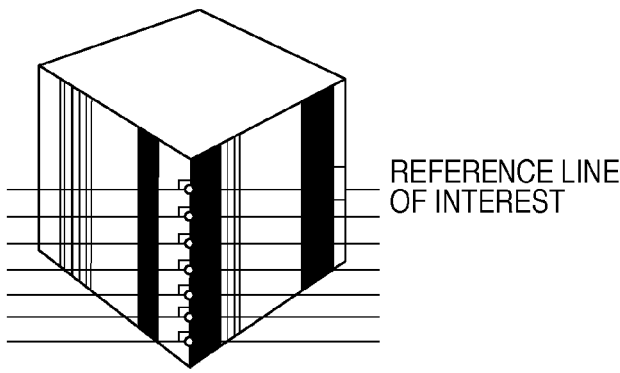

Next, a line segment (an orthogonal line segment in this case) which passes through the dividing point and is not parallel to the detected line segment is set for each dividing point as a reference line, as shown in FIG. 6C. FIG. 6D depicts a change in luminance value on a "Reference Line of Interest" shown in FIG. 6C.

The number of elements of the pattern array is set to 2N+1 herein. The luminance value pattern in the vicinity of the dividing point is assigned to one element within this array. Also, pieces of information on the two sides of the dividing point on the reference line are assigned to the remaining 2N elements such that N elements are present on each of these two sides. That is, the luminance value patterns in the vicinities of points serving as edges are sampled along the reference line, and set as elements of the pattern array, as shown in FIG. 6E. An edge can be detected from the reference line by, for example, calculating the difference between the pixels on the two sides of the pixel of interest on the reference line, and extracting a pixel having an extremum of the absolute value of the obtained difference.

Referring to FIG. 6E, the average value of the luminance values of two pixels present on the two sides of the pixel detected as an edge (along the reference line) is set as the value of each element of the pattern array. Referring again to FIG. 6E, the number of elements of the pattern array is 7 (N=3). Elements of the pattern array are set such that the order on the reference line is held and the luminance value of the dividing point is set as the (N+1)th element (the fourth element in FIG. 6E). Note that if less than (2N+1) edge points are present on the reference line, a flag indicating "no data" is set for the corresponding portion within the pattern array.

A line segment association process shown in step S104 of FIG. 3 will be described with reference to FIG. 7. A case in which line segments in two images (a first image and a second image) are associated with each other will be exemplified herein. Note that $N_1$ line segments and $N_2$ line segments are detected in the first image and the second image, respectively.

When this process starts, the association decision unit 14 generates a pattern array list from the pattern arrays of dividing points on the line segment detected from the second image (S301). Individual elements in the pattern array list are formed as a combination of the IDs of the line segments in the second image and the pattern arrays of the dividing points. Let $N_{list}$ be the length of the pattern array list, which corresponds to the number of dividing points of the line segments detected from the second image.

The association decision unit 14 sets "1" to a variable i corresponding to the IDs of the line segments in the first image to be associated (S302), and performs a corresponding line segment search process. That is, the association decision unit 14 searches the line segments in the second image for a line segment corresponding to the line segment with the ID i (S303). After the search for the line segment with the ID i is completed, the association decision unit 14 increments the ID i by one (S304).

After that, the association decision unit 14 determines whether the process is complete for all line segments in the first image. This determination is based on whether the ID i is larger than $N_1$. If the process is complete for all line segments (YES in step S305), the process ends; otherwise (NO in step S305), the process returns to step S303 again.

A corresponding line segment search process shown in step S303 of FIG. 7 will be described herein with reference to FIG. 8.

When this process starts, the association decision unit 14 sets "1" to a variable j corresponding to the IDs of the dividing points on the line segment with the ID i (S401). Also, all classes of a vote histogram used to decide a corresponding line segment are set to "0". The classes of the histogram correspond to respective line segments in the second image, and the number of them is $N_2$.

Figure 7:
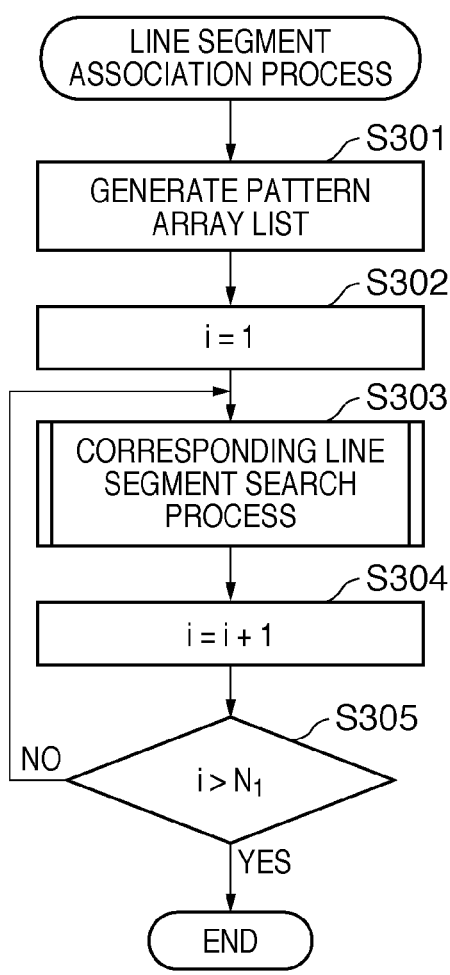
FIG. 7 is a flowchart showing a line segment association process shown in step S104 of FIG. 3.
Figure 8:
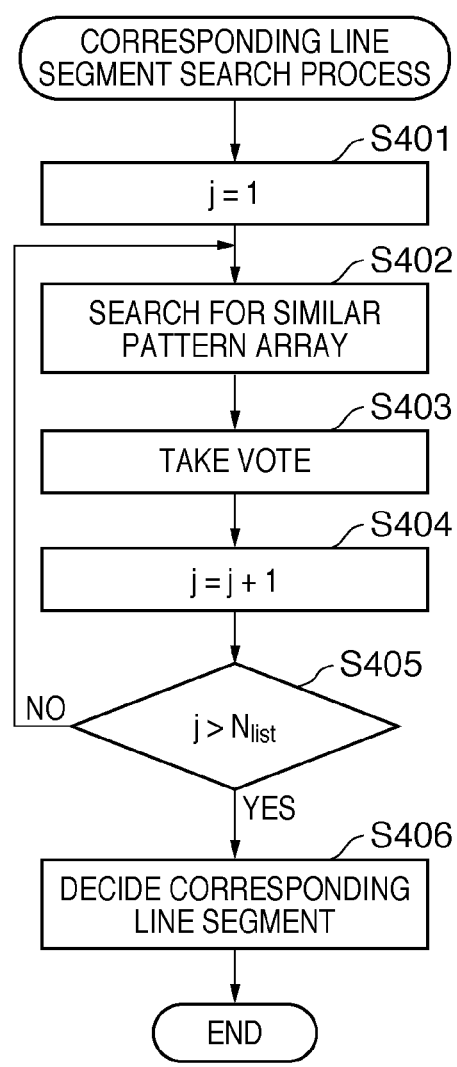
FIG. 8 is a flowchart showing a corresponding line segment search process shown in step S303 of FIG. 7.

The association decision unit 14 searches the pattern array list generated in step S301 of FIG. 7 for a pattern array which is most similar to the pattern array of the dividing point with the ID j on the line segment with the ID i (S402). A most similar pattern array is searched for based on the mean square error of (2N+1) elements of each pattern array. Note that the corresponding pattern array has a minimum mean square error. If a flag indicating no data has been set for one of certain elements of two pattern arrays, to be compared with each other, in the first image and the second image, these elements are not used in calculating the mean square errors.

After that, the association decision unit 14 decides the ID of a line segment corresponding to the pattern array of the dividing point with the ID j on the line segment with the ID i, and votes for a class corresponding to the line segment with the decided ID in the histogram (S403). At this time, a threshold is set to the mean square error in advance, and if the threshold is exceeded, it is determined that no corresponding line segment is present and no vote takes place.

After the association decision unit 14 increments the ID j by one (S404), it determines whether the process is complete for all dividing points on the line segment with the ID i. This determination is based on whether the ID j is larger than $N_{list}$. If it is determined that the process is not complete for all dividing points (NO in step S405), the process returns to step S402 again.

If the process is complete for all dividing points (YES in step S405), the association decision unit 14 decides a line segment in the second image corresponding to the line segment with the ID i in the first image (S406). In this case, a line segment with an ID corresponding to a maximum vote result is selected as a corresponding line segment.

As has been described above, according to the first embodiment, dividing points are set on a line segment detected in an image, and pattern arrays of dividing points in the image are compared with those of dividing points on line segments detected in other images, thereby searching for corresponding line segments. That is, a set of luminance values of a plurality of edge points on a reference line are set as elements of a pattern array. Each element of the pattern array is matched between the images for each line segment. Thus, even when similar line segments are present in an image or line segments are densely populated in the image, and erroneous matching of one or two elements occurs, it is determined whether the alignments of elements of the arrays match each other, so erroneous association of line segments between the images can be suppressed. As a result, a three-dimensional geometric model can be generated even for a physical object for which association has conventionally been too hard to generate its three-dimensional geometric model.

Second Embodiment

The second embodiment in which the processing time is prioritized will be described next. More specifically, in the second embodiment, pattern arrays held for respective dividing points are integrated into one pattern array, and the integrated pattern arrays of respective line segments are compared with each other (that is, each line segment has one pattern array). Note that the configuration and overall operation of an image processing apparatus 10 according to the second embodiment are the same as in FIGS. 1 and 3 referred to in the description of the first embodiment, and a description thereof will not be given. Importance will be attached to a difference from the first embodiment herein. A difference lies in a line segment association process in step S104 of FIG. 3.

A process of associating line segments in images with each other according to the second embodiment will be described herein with reference to FIG. 9. A case in which line segments in two images (a first image and a second image) are associated with each other will be exemplified herein. Note that $N_1$ line segments and $N_2$ line segments are detected in the first image and the second image, respectively.

When this process starts, an association decision unit 14 generates one representative pattern array in correspondence with each of the line segments detected from the first image and the second image (S501). The representative pattern array contains (2N+1) elements, like the pattern array. A representative pattern array is generated by calculating the average vector of pattern arrays of all dividing points on a line segment. The average vector is calculated by summing up the values of the elements of the pattern arrays for each element, and dividing the sum by the number of dividing points. If a flag indicating "no data" is set for a certain element of the pattern array, this element is excluded from elements, the average value of which is calculated. As for an element for which a flag indicating "no data" is set for all dividing points, a flat indicating "no data" is also set for the representative pattern array.

The association decision unit 14 sets "1" to a variable i corresponding to the IDs of the line segments in the first image to be associated (S502), and performs a corresponding line segment search process. That is, the association decision unit 14 searches for a representative pattern array of a line segment in the second image, which is most similar to the representative pattern array of the line segment with the ID i (S503). A most similar representative pattern array is searched for based on the mean square error of (2N+1) elements of the representative pattern array. A line segment in the second image, which has a minimum mean square error, is set as that corresponding to the line segment with the ID i. If a flag indicating no data has been set for one of certain elements of two representative pattern arrays to be compared with each other, this element is not used in calculating the mean square error. A threshold is set to the mean square error in advance, and if the threshold is exceeded, it is determined that no corresponding line segment is present.

After the search for the line segment with the ID i is completed, the association decision unit 14 increments the ID i by one (S504). After that, the association decision unit 14 determines whether the process is complete for all line segments in the first image. This determination is based on whether the ID i is larger than $N_1$. If the process is complete for all line segments (YES in step S505), the process ends; otherwise (NO in step S505), the process returns to step S503 again.

As has been described above, according to the second embodiment, pattern arrays obtained for respective dividing points on each line segment are integrated into one pattern array (representative pattern array) to generate integrated pattern arrays for respective line segments, and the integrated pattern arrays are compared with each other, thereby associating line segments in images with each other. This makes it possible to associate line segments in images with each other at high speed.

Although exemplary embodiments of the present invention have been described above, the present invention is not limited to the embodiments which have been described above and shown in the accompanying drawings, and can be appropriately modified and practiced without departing from the scope of the present invention.

The present invention can be embodied as, for example, a system, an apparatus, a method, and a program or a storage medium. More specifically, the present invention may be applied to a system including a plurality of devices or an apparatus including only one device.

Several modifications according to the present invention will be described below herein.

(First Modification)

Although dividing points are set on a detected line segment and a pattern array is obtained for each of the dividing points in the above-described embodiments, the feature description method (pattern array calculation method) is not limited to this. For example, pattern arrays may be obtained for all points on the detected line segment. In line segment detection, to perform piecewise approximation of the edge detection result, pattern arrays may be obtained for all edges to be approximated by corresponding line segments.

(Second Modification)

Although the luminance value of an edge point on a reference line is set as an element of a pattern array in the above-described embodiments, the present invention is not limited to the luminance value, and any information can be adopted as long as it pertains to the pixel value. As one example, one of the R, G, and B values of the edge point on the reference line may be held. As another example, a value obtained by converting the pixel value into that in another color space such as a YUV color space may be held. As still another example, instead of holding only one value for each edge point on the reference line, three values: the R, G, and B values may be held, and pattern arrays may be compared based on the R, G, and B values, thereby calculating the mean square error. In this case as well, the color representation method is not limited to RGB representation, and color spaces such as a YUV or CbCr color space may be adopted for color representation.

(Third Modification)

Although a corresponding line segment is searched for using pieces of information on the two sides of a dividing point on a reference line in the above-described embodiments, the present invention is not limited to this. When, for example, the background considerably changes, information on one side often has no meaning. Hence, only information on one side of the dividing point on the reference line may be used to search for a corresponding line segment. Also, corresponding line segments may be independently searched for on the two sides, and the two results may be finally integrated.

(Fourth Modification)

Although the average value of the luminance values of two pixels on the two sides of an edge point on a reference line is held as an element of a pattern array in the above-described embodiments, the information held as an element of a pattern array is not limited to this. Any information can be adopted as an element of a pattern array as long as it indicates the color change pattern of the luminance value. When, for example, the window size of an edge detection operator on the reference line is large, the average value of the luminance values of pixels, the number of which corresponds to the window size, may be held as an element of a pattern array. Also, information on the luminance value of the pixel present between the edges on the reference line may be used. This is because the assumption that the edges have no considerable change in luminance value between them and have nearly the same luminance value holds true. The average or median value of the luminance values, for example, can be used as information on the luminance value of the pixel present between the edges on the reference line. Moreover, the luminance gradient at the edge point on the reference line may be used as an element of a pattern array.

(Fifth Modification)

On the assumption that the corresponding relationship between line segments contains an erroneous correspondence, a line segment on a three-dimensional space may be obtained by, for example, a robust estimation method. The method disclosed in reference 3 requires correspondences of at least six line segments between three images. To meet this requirement, a method called RANSAC (Random Sample Consensus) disclosed in M. A. Fischler and R. C. Bolles, "Random sample consensus: a paradigm for model fitting with applications to image analysis and automated cartography," Communications of ACM, vol. 24, no. 6, pp. 381-395, 1981 (to be referred to as reference 7 hereinafter) is utilized. In this case, the line segment on the three-dimensional space can be precisely obtained even if the corresponding relationship contains an erroneous correspondence. More specifically, six line segments are randomly extracted from a set of associated line segments, and the line segments and the position and orientation of a camera on the three-dimensional space are calculated using the method described in reference 3. The number of correspondences of line segments in a set which agrees with the calculated position and orientation of the camera is counted. This process is repeated a predetermined number of times to select a solution when a largest number of consensuses are obtained.

(Sixth Modification)

Although the mean square error is used to calculate the similarities of pattern arrays and representative pattern arrays in the above-described embodiments, the similarity calculation method is not limited to this, and any method may be adopted as long as the similarity between the vectors can be compared with each other. For example, the similarity of each element may be calculated using a function with which a smaller output is generated in response to a large input or a larger output is generated in response to a smaller input, and the similarity between the vectors may be calculated based on the sum or average value of the outputs of the similarities.

(Seventh Modification)

Although line segments of a physical object on a three-dimensional space are obtained based on association in which line segments in three images are associated with each other, the present invention is not limited to this. For example, the number of images is not limited to three, and may be any number as long as it is two or more. If the number of images is two, after the line segments in the two images are associated with each other, line segments on the three-dimensional space can be obtained by a method disclosed in, for example, reference 2 or H. Bay, A. Ess, A. Neubeck and L. Van Gool, "3D from line segments in two poorly-textured, uncalibrated images," Proc. 3rd International Symposium on 3D Data Processing, Visualization and Transmission, pp. 496-503, 2006 (to be referred to as reference 8 hereinafter). Also, if three or more images are used, after the line segments in the images are associated with each other, line segments on the three-dimensional space can be obtained by a method disclosed in reference 3.

(Eighth Modification)

Although representative pattern arrays are calculated for line segments detected in a first image and a second image in the second embodiment, they need not always be calculated for line segments in both the images to be compared. For example, a representative pattern array is calculated for a line segment in only one image. Corresponding line segments may be obtained by comparing the pattern array of dividing points on the line segment in one image with a representative pattern array in the other image, and taking a vote, as in the first embodiment.

(Ninth Modification)

Although a feature of a detected line segment is represented (described) based on information on a pixel on a line segment which passes through a dividing point on the detected line segment in the above-described embodiments, the line segment feature description method is not limited to this. For example, although the description is done based on information on a pixel on a line segment with a width of one pixel in the above-described embodiments, it may be done based on information on a pixel within a window with a width of a plurality of pixels. Also, a window which passes through a detected line segment, is perpendicular to the detected line segment, and has a width of N pixels may be set, an edge may be detected using pieces of information on the N pixels, and a feature of the line segment may be described based on information on the pixel on the detected edge point.

(10th Modification)

Although a three-dimensional geometric model of a target object is generated in the above-described embodiments, the above-mentioned association process may be performed for another use application. For example, the relative position and orientation of an image capturing apparatus when it captures a plurality of images may be calculated using information on associated line segments.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-291396 filed on Dec. 22, 2009, which is hereby incorporated by reference herein in its entirety.

What is claimed is:

1. An image processing apparatus comprising:
   an input unit configured to input a plurality of images obtained by capturing a target object from different viewpoints;
   a first detection unit configured to detect a plurality of line segments inherent to the target object and which forms the target object from each of the plurality of input images;
   a setting unit configured to set, for each of the plurality of detected line segments, a reference line which intersects with the line segment;
   a second detection unit configured to detect an edge on the reference line on the basis of a pixel value change pattern on the reference line;
   an array derivation unit configured to obtain a pattern array by aligning patterns, each of which is a pixel value change pattern of pixels in the vicinity of the edge; and
   a decision unit configured to decide association of the detected line segments between the plurality of images by comparing the patterns, contained in the obtained pattern array, between the plurality of images.

2. The apparatus according to claim 1, further comprising a model derivation unit configured to obtain a geometric model of the target object based on the detected line segments and the decided association.

3. The apparatus according to claim 1, wherein the pixel value change pattern includes a luminance change pattern.

4. The apparatus according to claim 1, wherein the pixel value change pattern includes a color change pattern.

5. The apparatus according to claim 1, wherein the reference line is perpendicular to the detected line segment.

6. The apparatus according to claim 1, wherein
   said setting unit includes
   a dividing point setting unit configured to set a plurality of dividing points on the detected line segment, and
   a reference line setting unit configured to set, for each of the set dividing points, a plurality of reference lines which pass through the dividing points and intersect with the line segment which includes the dividing points.

7. The apparatus according to claim 6, wherein
   said array derivation unit obtains a representative pattern array in which pixel value change patterns which intersect with identical line segments on the plurality of reference lines are aligned in combination with each other, and
   said decision unit decides the association based on the obtained representative pattern array.

8. The apparatus according to claim 7, wherein the representative pattern array is obtained by averaging and aligning the pixel value change patterns which intersect with the identical line segments on the plurality of reference lines.

9. A processing method for an image processing apparatus, comprising:
   inputting a plurality of images obtained by capturing a target object from different viewpoints;
   detecting a plurality of line segments inherent to the target object and which forms the target object from each of the plurality of input images;
   setting, for each of the plurality of detected line segments, a reference line which intersects with the line segment;
   detecting an edge on the reference line on the basis of a pixel value change pattern on the reference line;
   obtaining a pattern array by aligning patterns, each of which is a pixel value change pattern of pixels in the vicinity of the edge; and
   deciding association of the detected line segments between the plurality of images by comparing the patterns, contained in the obtained pattern array, between the plurality of images.

10. A non-transitory computer-readable storage medium storing a program for causing a computer to execute a processing method defined in claim 9.

* * * * *